US005535428A

United States Patent [19]

King et al.

[11] Patent Number: 5,535,428

[45] Date of Patent: Jul. 9, 1996

[54] METHOD AND APPARATUS FOR SELECTIVELY RETAINING MESSAGES RECEIVED BY A RADIO RECEIVER BASED UPON MESSAGE CONTENT

[75] Inventors: Gerald R. King, Ft. Lauderdale; Robert D. Lloyd, Boca Raton; Leonard E. Nelson, Boynton Beach, all of Fla.

[73] Assignee: Motorola, Inc., Schaumburg, Ill.

[21] Appl. No.: 281,878

[22] Filed: Jul. 28, 1994

[51] Int. Cl.[6] .......... H04Q 1/00

[52] U.S. Cl. .......... 455/38.4; 455/186.1; 340/825.44; 340/825.27

[58] Field of Search .......... 455/38.1, 38.4, 455/186.1, 186.2; 340/825.44, 825.47, 825.27; 348/157

[56] References Cited

U.S. PATENT DOCUMENTS

| | | | |
|---|---|---|---|
| H1173 | 4/1993 | Davis et al. . | |
| 4,758,834 | 7/1988 | Sato et al. . | |
| 4,845,491 | 7/1989 | Facenda et al. | 340/825.44 |
| 4,868,561 | 9/1989 | Davis . | |
| 4,922,221 | 5/1990 | Sato et al. . | |
| 4,994,797 | 2/1991 | Breeden . | |
| 5,032,835 | 7/1991 | DeLuca | 340/825.44 |
| 5,043,721 | 8/1991 | May . | |
| 5,122,778 | 6/1992 | Erhart et al. . | |
| 5,241,305 | 8/1993 | Fascenda et al. | 455/38.1 |
| 5,398,021 | 3/1995 | Moore | 340/852.44 |
| 5,410,302 | 4/1995 | Dulaney, III et al. | 340/825.44 |
| 5,440,559 | 8/1995 | Gaskill | 340/825.44 |

FOREIGN PATENT DOCUMENTS

| | | | |
|---|---|---|---|
| 93/23932 | 11/1993 | WIPO | 45/38.4 |

*Primary Examiner*—Andrew I. Faile
*Attorney, Agent, or Firm*—Kelly A. Gardner

[57] ABSTRACT

A radio receiver (110) for processing a message including information about a sports event includes a message processing element (555) for locating, within the message, a final flag (225) indicative of a status of the sports event and a controller (515) coupled to the message processing element (555) for determining whether the final flag (225) is equivalent to a first or a second value. The controller (515) further determines that a score indicated by the message is a non-final score when the final flag (225) is equivalent to the first value and determines that the score is a final score when the final flag (225) is equivalent to the second value.

12 Claims, 6 Drawing Sheets

100

105

METHOD AND APPARATUS FOR SELECTIVELY RETAINING MESSAGES RECEIVED BY A RADIO RECEIVER BASED UPON MESSAGE CONTENT

FIELD OF THE INVENTION

This invention relates in general to radio receivers, and more specifically to a radio receiver having a memory for selectively retaining received messages.

BACKGROUND OF THE INVENTION

Portable radio receivers, such as pagers, are typically carried by users for the purpose of receiving messages when away from a computer or telephone. Generally, a radio receiver announces reception of a message to the user by generating an alert, such as an audible tone or visible presentation. The radio receiver also usually includes a display device, such as a liquid crystal display, such that the user can read the message, either automatically or in response to manual manipulation of controls accessible from the exterior of the radio receiver. The message is typically stored for a finite length of time so that the user can re-read the message or postpone reading the message until a later time.

Recently, information service providers have implemented communication systems in which information relating to a particular topic is transmitted to a radio receiver when the user of that receiver has subscribed to the service. By way of example, a user can subscribe to a financial service which provides up-to-date information of financial interest. Additionally, a user can subscribe to a sports news service for providing information about sports events, such as baseball or football games. In such a situation, incoming messages usually replace previous messages about the same topic in the memory such that the user is not confused by conflicting information. For instance, when the radio receiver receives an updated score for a particular game, any previously received score for that game is generally discarded so that the user does not mistake the outdated, previous score for the current score. Similarly, incorrect, outdated financial information, such as a stock price, is replaced with current information to keep the user informed of the latest developments in that area. However, there could be instances when the user would benefit from the ability to refer back to information concerning a particular topic even when more recent information regarding that topic has been received.

Thus, what is needed is a method and apparatus for selectively retaining messages about a particular topic such that the user can later refer to retained messages even when more recent messages have been received.

SUMMARY OF THE INVENTION

A method, in a radio receiver, for processing a message including information about a sports event, includes the step of locating, within the message, a final flag indicative of a status of the sports event within the message by referencing a memory to determine a predetermined location for the final flag within the message and retrieving the final flag at the predetermined location within the message. The method further includes the steps of determining whether the final flag is equivalent to a first or a second value, determining that a score indicated by the message is a non-final score when the final flag is equivalent to the first value and that the score is a final score when the final flag is equivalent to the second value, and storing the message in the memory. When a further message is received, the further message is stored in the memory, and when the score indicated by the message is a non-final score, the message is discarded. When the score indicated by the message is a final score, the further message is stored in the memory without discarding the message.

A radio receiver for processing a message having information about a sports event includes a message processing element for locating, within the message, a final flag indicative of a status of the sports event. A controller determines whether the final flag is equivalent to a first or a second value, and further determines that a score indicated by the message is a non-final score when the final flag is equivalent to the first value and that the score is a final score when the final flag is equivalent to the second value. A memory is included in the radio receiver for storing the message, and a receiving circuit is included for receiving a further message. The memory includes means for storing the further message in the memory and discarding the message when the score indicated by the message is a non-final score and for storing the further message in the memory without discarding the message when the score indicated by the message is a final score.

DESCRIPTION OF A PREFERRED EMBODIMENT

Figure 1:
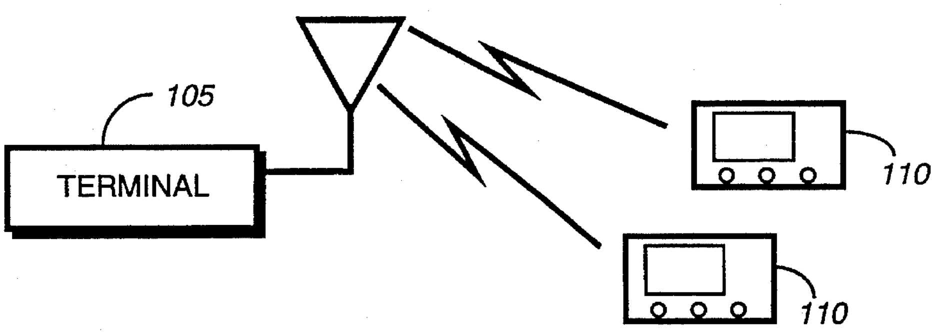
FIG. 1 is an electrical block diagram of a communication system in accordance with the present invention.

FIG. 1 is an electrical block diagram of a communication system 100 comprising a terminal 105 for transmitting messages concerning sports events to a plurality of radio receivers 110, such as portable pagers or transceivers, over the air. The messages received by the radio receivers 110 preferably include not only information for display to the user but also an indication by which the receivers 110 can determine whether a received message includes a final score for a given sports event.

According to the present invention, the radio receivers 110 receive common messages about sports events on the same paging address. By way of example, when the radio receivers 110 are to receive information about baseball or football, each radio receiver 110 is associated with both the common paging address and with a particular sports team by means of a stored recipient identification code (ID) indicative of that team. A radio receiver 110 preferably receives a sports message and scans the message to determine whether or not its "team ID" is included in that message to indicate that the message is of interest to the user. When the team ID associated with the radio receiver 110 is included in the message, the radio receiver 110 proceeds to locate an alert code included within the message to determine which of predetermined alerts is to be generated. When, for instance, the message information indicates that the sports team associated with the receiver 110 has scored a run or a touchdown, an alert code within the message can prompt the receiver 110 to generate a "cheer" or "yea" sound to inform the user of a favorable occurrence. As mentioned, the same message is provided to all of the receivers 110. When the same message is received by a receiver 110 associated with the opposing team, a different alert code within the message can result in the generation of a "boo", "sigh", or other unfavorable sound by that receiver 110.

Furthermore, the message includes information by which the radio receiver 110 can determine whether a score included in the information is a final score or a non-final score. When the score is a non-final score, later received messages concerning the sports team associated with the receiver 110 replace the message in memory. In this manner, the user is not confused by several different messages each indicating a different score. When, conversely, the score indicated by the message is final, the message is not replaced by later received messages so that the user can conveniently read the final score of a game at subsequent times.

Figure 2:
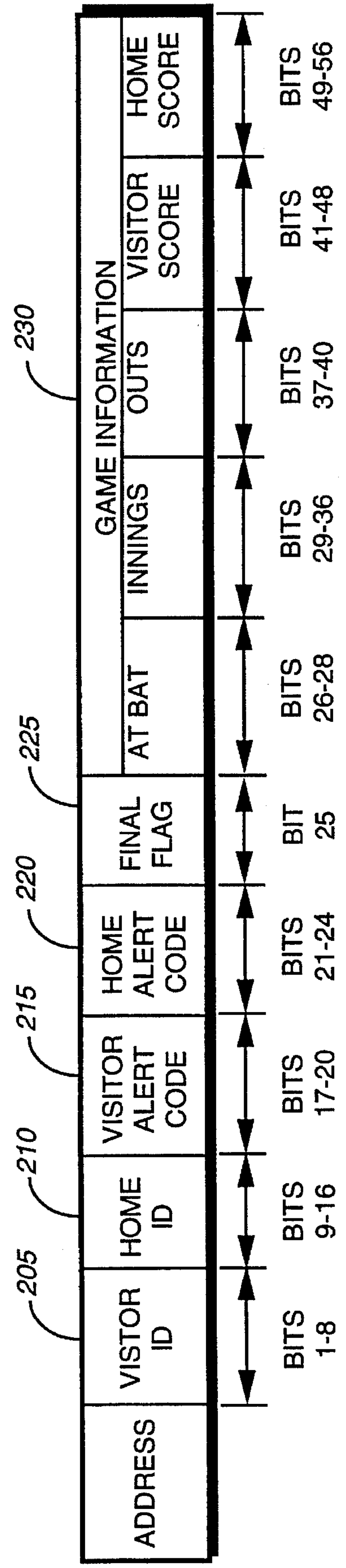
FIG. 2 is a signal diagram of a radio frequency signal including a message transmitted by a terminal included within the communication system of FIG. 1 to a radio receiver included within the communication system of FIG. 1 in accordance with the present invention.

FIG. 2 illustrates an example of a radio frequency (RF) signal including a message that can be transmitted from the terminal 105 to the receivers 110 to update users of the receivers 110 on a particular sports event, such as baseball. The RF signal includes a paging address which, as mentioned above, is a common address associated with each of the receivers 110 included in the communication system 100. Appended to the address is the message, which preferably comprises recipient, or team, IDs 205, 210 located in predetermined locations within the message to indicate which two baseball teams are currently playing a baseball game that is the subject of the message. The team IDs 205, 210 can, for example, each consume eight bits of the message. According to the present invention, the team IDs 205, 210 indicate by their locations which of the two teams is the home team and which of the two teams is the visitor team. In this example, the ID 205 for the visitor team is included first in the message, at bits one through eight, and is followed by the home team ID 210, at bits nine through sixteen. The message further comprises a visitor alert code 215 and a home alert code 220, each located in different predetermined locations. These alert codes 215, 220 can, for example, be respectively located at bits seventeen through twenty and bits twenty-one through twenty-four.

According to the present invention, the message also includes a "final" flag 225, which is indicative of the status, e.g., final or non-final, of the sports event to which the message relates. The flag is preferably set to indicate whether or not the sports event played by the home and visitor teams is over such that a final score has been received for the event. This flag can simply include a single bit of information located, for example, at the twenty-fifth bit of the message. The bit could be set to equal zero when the message concerns a final score and set to equal one when the message concerns a non-final score. Additionally, the message can include game information 230 to inform the user of the current game status. Such game information 230 can, for example, include details about which team is at bat, the inning of the game, the number of outs for the team at bat, and the score of the game.

In accordance with the present invention, a radio receiver 110 associated with one of the team IDs 205, 210 can determine, from the location of its ID within the message, whether its team is the home team or the visitor team. Thereafter, the radio receiver 110 can advantageously determine the location of the appropriate alert code within the message such that an alert is generated to indicate whether the latest game event is favorable or unfavorable to the team associated with the receiver 110. Furthermore, the radio receiver 110 can easily determine, from the team IDs 205, 210, the final flag 225, and their locations, whether the message is an update about a game in which a team favored by the user is playing. When the message is an update, the message preferably replaces any previously received message about that game in the memory of the radio receiver 110. When a previously received message is indicative of a final score for a game, the previously received message is preferably retained even when further messages about the user's team are received so that the user can choose to be presented with messages concerning final scores at any time.

It will be appreciated that the message of FIG. 2 is depicted for example purposes only and that the placement of the team IDs 205, 210, the alert codes 215, 220, the final flag 225, and the various information included in the game information 230 can vary as long as the placement is predetermined and recognizable by the receiver 110. It will be further appreciated that the number of team IDs and alert codes can vary depending upon the sport with which the radio receiver 110 is associated. If, for example, information about a horse race is to be transmitted to the receivers 110, the number of team IDs and alert codes would be equal to the number of entries in the race. The final flag 225 could still, of course, be utilized to indicate that final results had been received for the sports event.

Figure 3:
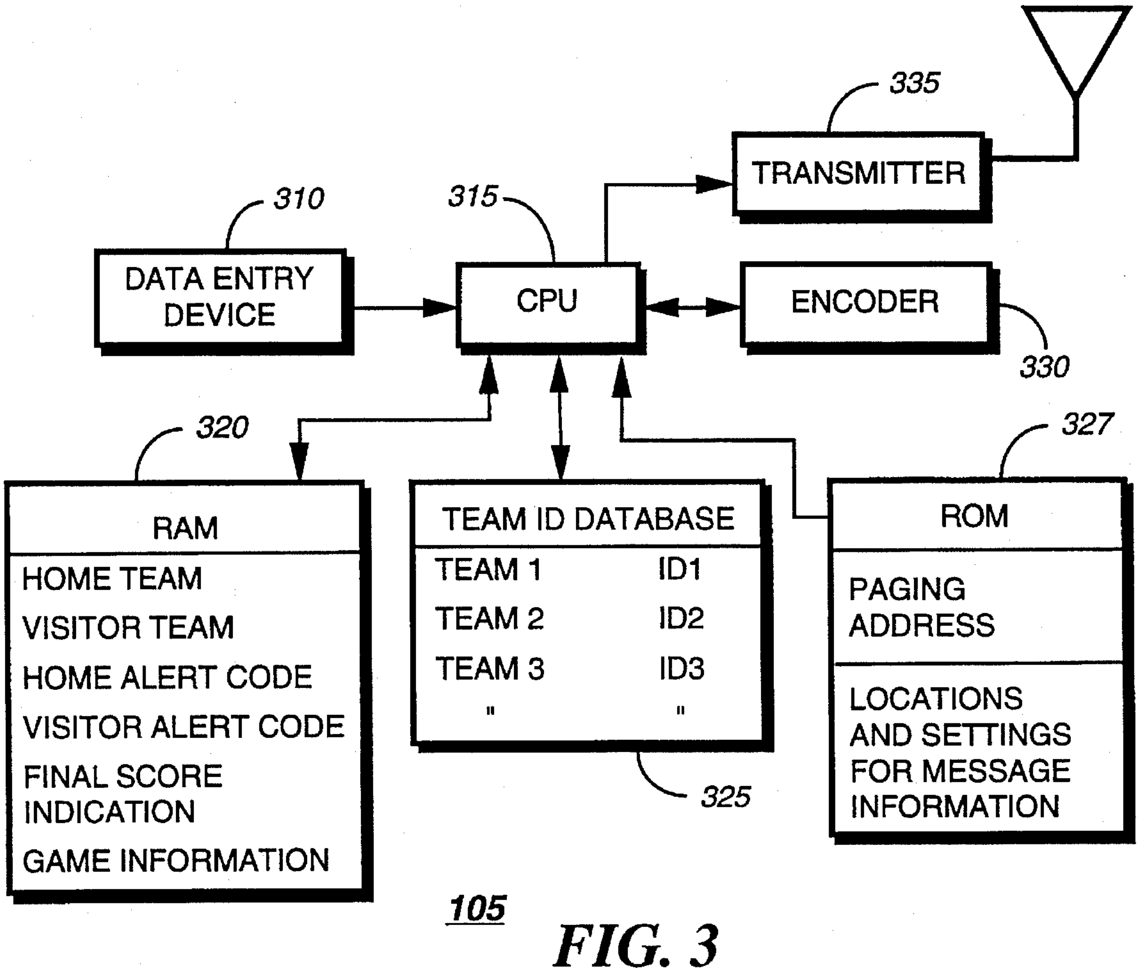
FIG. 3 is an electrical block diagram of the terminal included within the communication system of FIG. 1 in accordance with the present invention.

Referring next to FIG. 3, an electrical block diagram of the terminal 105 is depicted. The terminal 105 preferably comprises a data entry device 310, such as a keyboard, for entering the game information, the alert codes for the different teams, an indication of whether a final result for the sports event has been received, and information about which teams are involved in the sports event. Additionally, at the beginning of a sports event such as a baseball game, the data entry device 310 can be utilized to enter information indicative of which team is the home team and which team is the visitor team. The information provided by the data entry device 310 is received by a central processing unit (CPU) 315 coupled thereto for controlling the operation of the terminal 105. The CPU 315 stores the information provided by the data entry device 310 in a memory, such as a random access memory (RAM) 320. The terminal 105 further comprises a database 325 for storing a list of all of the teams and the team IDs associated therewith. The team ID can be, if sufficient space is available within the message, the name of the team. Alternatively, the team ID could be an abbreviated form of the team name or any other information by which the team can be identified. A read only memory (ROM) 327 stores the paging address shared by the receivers 110 included in the communication system 100 and further stores locations and settings for the various information to be included in the message. More specifically, the predetermined locations within the message for each type of information, e.g., alert code, team ID, and final score indication, and the value to which a bit of the message is set to indicate final and non-final scores, are stored in the ROM 327 for use by the terminal 105 in sending the message.

The terminal 105 also includes an encoder 330 coupled to the CPU 315 for encoding the address, the team IDs, the alert codes, the final flag, and the game information into a message in a conventional manner. By way of example, the message could be encoded using the POCSAG (Post Office Code Standardization Advisory Group) signalling format or the GSC (Golay Sequential Code) signalling format. The encoded message is provided to a transmitter 335 for transmitting the message as a radio frequency signal.

Figure 4:
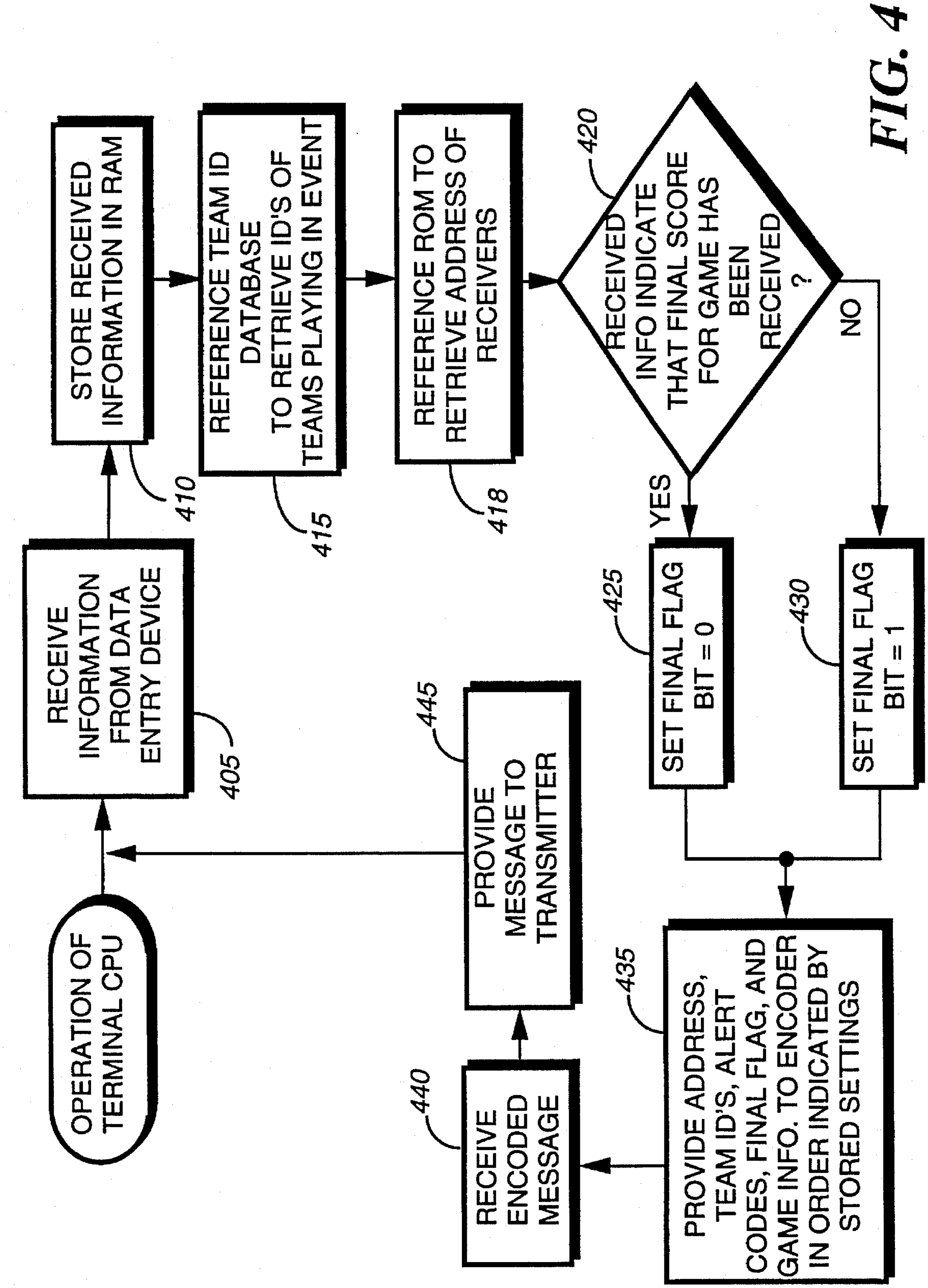
FIG. 4 is a flowchart of the operation of a processing unit included within the terminal of FIG. 3 in accordance with the present invention.

FIG. 4 is a flowchart illustrating the operation of the terminal CPU 315 in accordance with the present invention. Preferably, the CPU 315 receives, at step 405, the information, e.g., the game information, alert codes, visitor and home team information, and, when necessary, the final score indication, from the data entry device 310 and stores, at step 410, the information in the RAM 320. Thereafter, the CPU 315 references, at step 415, the team ID database 325 to determine the team IDs for the visitor and home teams involved in the current event. The CPU 315 further references, at step 418, the ROM 327 to retrieve the paging address of the receivers 110. When, at step 420, the information received from the data entry device 310 indicates that a final score has been received for the subject game, the controller 315 references the ROM 327 to set the final flag bit to a predetermined value, such as zero, at step 425. When the game has not been concluded, the final flag is set, at step 430, to a different predetermined value, such as one. The address, team IDs, alert codes, final flag, and game information are then, at step 435, provided to the encoder 330 for encoding into a message having the appropriate signalling format and including the different types of message information at the appropriate predetermined locations. By way of example, the CPU 315 can provide the visitor team ID to the encoder 330 as the first eight bits of the message when the first eight bits of the message are the predetermined location for the visitor team ID. When bits nine through sixteen are the predetermined location for the home team ID, the CPU 315 can provide the home team ID to the encoder 330 as the next eight bits of the message. This procedure is preferably also followed for placement of the visitor and home team alert codes, the final flag, and the game information in predetermined locations of the message. After the encoded message is received, at step 440, by the controller 315, the message is provided, at step 445, to the transmitter 335 for transmission to the receivers 110.

Figure 5:
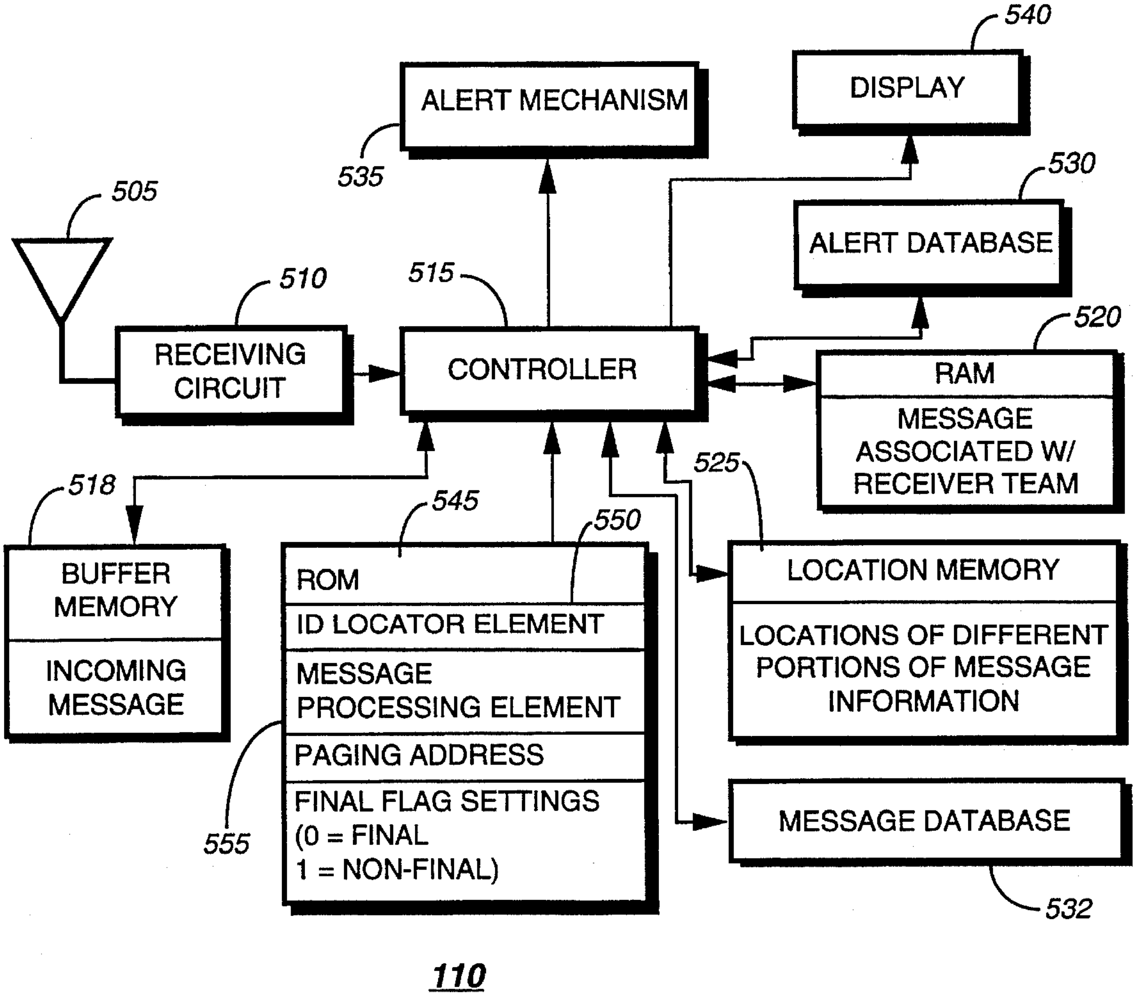
FIG. 5 is an electrical block diagram of the radio receiver included within the communication system of FIG. 1 in accordance with the present invention.

Referring next to FIG. 5, an electrical block diagram of the radio receiver 110 is shown. The radio receiver 110 preferably includes an antenna 505 for receiving an RF signal transmitted by the terminal 105 (FIG. 1). A receiving circuit 510 coupled to the antenna 505 decodes the RF signal to recover the message and address included therein in a manner well known to one of ordinary skill in the art and provides the message to a controller 515, which controls the operation of the radio receiver 110. The radio receiver 110 further comprises a buffer memory 518 for temporarily storing the incoming message and address, and a random access memory (RAM) 520 into which the message is moved when the incoming address is equivalent to the address associated with the receiver 110. A location memory 525 stores parameters including the predetermined locations within each message for the visitor team ID, home team ID, visitor alert code, home alert code, final flag, and game information, and another memory, e.g., a message database 532, stores messages that are associated with final scores, as indicated by final flags set in the messages. Additionally, an alert database 530 preferably stores a listing of alert codes that can be received in the messages transmitted by the terminal 105 and a listing of alert information, such as an alert pattern for driving a transducer or a recorded sound for driving a speaker, corresponding thereto.

The radio receiver 110 further comprises an alert mechanism 535 for generating an alert based upon the alert information stored in the alert database 530 and a display 540 for displaying the game information included in the message to the user. Another memory, such as a read only memory (ROM) 545, stores firmware elements used in processing a received message. According to the present invention, such firmware elements include an ID locator element 550 for monitoring the message to find a team ID associated with the receiver 110 and determining the location thereof within the message. A message processing element 555 utilizes stored final flag settings to determine whether the message concerns a game for which a final score has been received. The ROM 545 further stores the paging address associated with the receiver 110.

The controller 515, RAM 520, alert database 530, location memory 525, ROM 545, RAM 520, buffer memory 518, and message database 532 can, by way of example, be implemented using a microcomputer, such as the MC68HC05, C08, or C11 series manufactured by Motorola, Inc. Alternatively, the above-listed devices can be implemented through use of hardwired elements capable of performing equivalent operations. The antenna 505, receiving circuit 510, alert mechanism 535, and display 540 can be implemented using conventional devices.

According to the present invention, the radio receiver 110 can advantageously determine from a message whether a team of which the user is a fan is the subject of the message. Additionally, the receiver 110 can determine whether the team associated with the receiver 110 is the home team or the visitor team in order to perform further message processing. For example, the receiver 110 preferably generates an alert based upon whether the receiver 110 is associated with the home team or the visitor team. Furthermore, the receiver 110 can conveniently determine, based on the value of the final flag bit in the message, whether the game score in the message is a final score. Preferably, when the message concerns a non-final score, the message is replaced by further incoming messages so that the user is not confused by more than a single message relating conflicting scores about the same game. When the message concerns a final score for a game, that message is retained in the message database 532 so that further messages do not cause its erasure. Therefore, the user is able to access messages including final scores for games even when further messages have been received.

Figure 6:
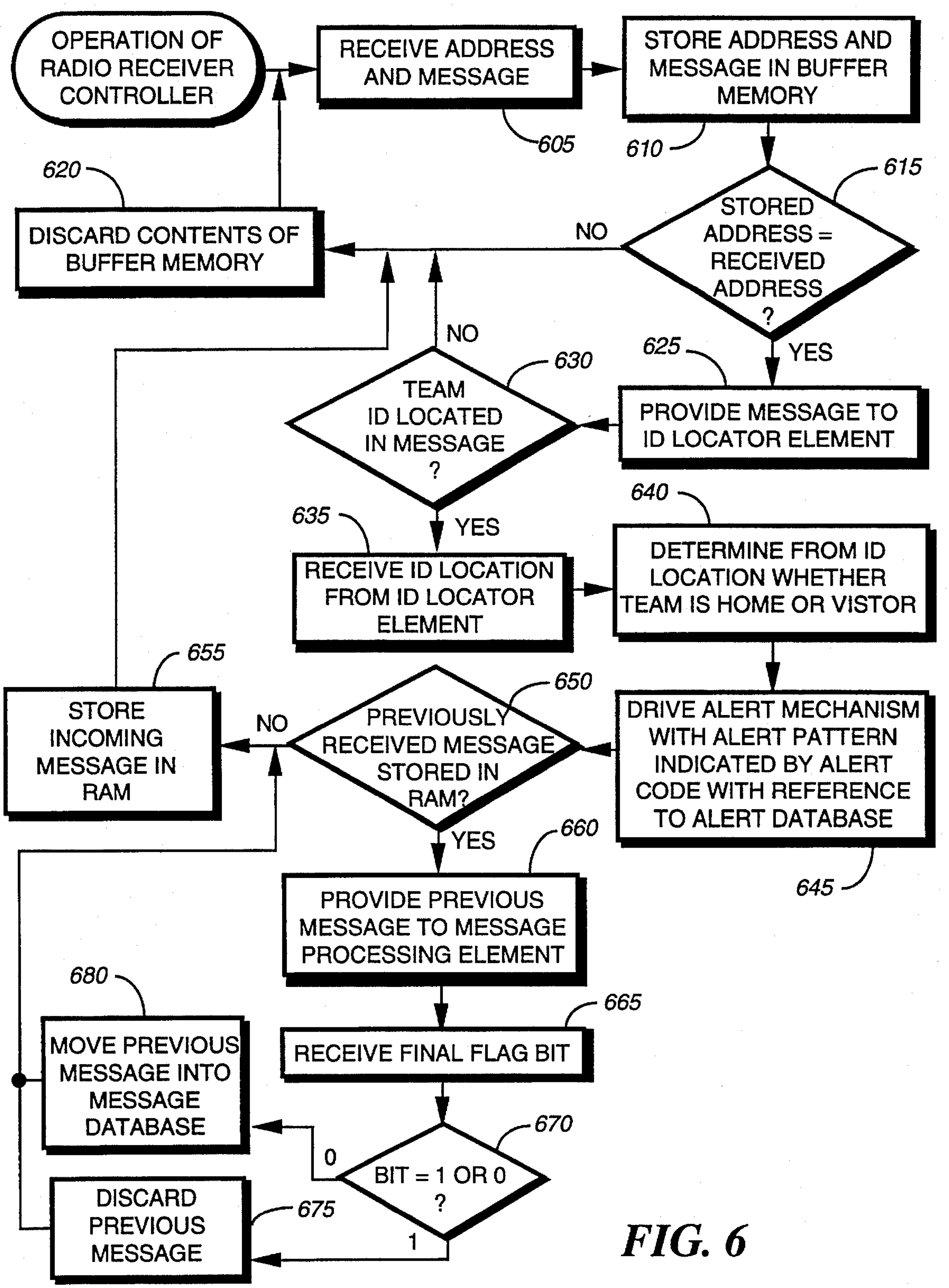
FIG. 6 is a flowchart of the operation of a controller included within the radio receiver of FIG. 5 in accordance with the present invention.

FIG. 6 is a flowchart depicting the operation of the radio receiver controller 515 (FIG. 5) in accordance with the present invention. At step 605, the controller 515 receives the address and message from the receiving circuit 510 and stores, at step 610, the address and message in the buffer memory 518. When, at step 615, the received address is not equivalent to the address stored in the ROM 545, the message is discarded from the buffer memory 518, at step 620. When, at step 615, the received address is equivalent to the stored address, the message is provided, at step 625, to the ID locator element 550 (FIG. 5). When the team ID associated with the receiver 110 is not found, at step 630, the contents of the buffer memory 518 are discarded, at step 620. When the team ID associated with the receiver 110 is located by the ID locator element 550, the controller 515, at step 635, receives the ID location and determines therefrom, at step 640, whether the team associated with the receiver 110 is the home team or the visitor team in the current game. At step 645, the controller 515 thereafter drives the alert mechanism 535 with the alert pattern indicated by the alert code associated with either the home team or the visitor team, as indicated by the ID location.

Next, at step 650, the controller 515 determines whether a previously received message is stored in the RAM 520. When a previous message is not stored in the RAM 520, the incoming message, at step 655, is moved from the buffer memory 518 into the RAM 520. When, on the other hand, a previous message is stored in the RAM 520, the controller 515 provides, at step 660, the previous message to the message processing element 555 (FIG. 5) and then receives therefrom, at step 665, the final flag bit. When, at step 670, the final flag bit is set to a first predetermined value, such as one, indicating that the previous message includes a non-final score, the previous message is discarded, at step 675, and the incoming message is stored in the RAM 520, at step 655. When, at step 670, the final flag bit is equal to a second predetermined value, such as zero, indicating that the previous message includes a final score, the previous message is moved, at step 680, into the message database 532, and the incoming message is stored-in the RAM 520, at step 655.

It will be appreciated that alternate embodiments of the present invention can receive and store all messages received on the common paging address such that the user can read messages about games in which his team is not playing. In such a situation, received messages would be preferably stored along with an indication of the teams playing therein and an indication of whether the game score was final. Upon reception of a further incoming message, the message would only replace a previously received non-final message for the same game involving the same teams. Other non-final messages would not be disturbed in the memory. In this manner, the user could conveniently access all of the current scores for different games, such as for all of the games in a baseball league.

Figure 7:
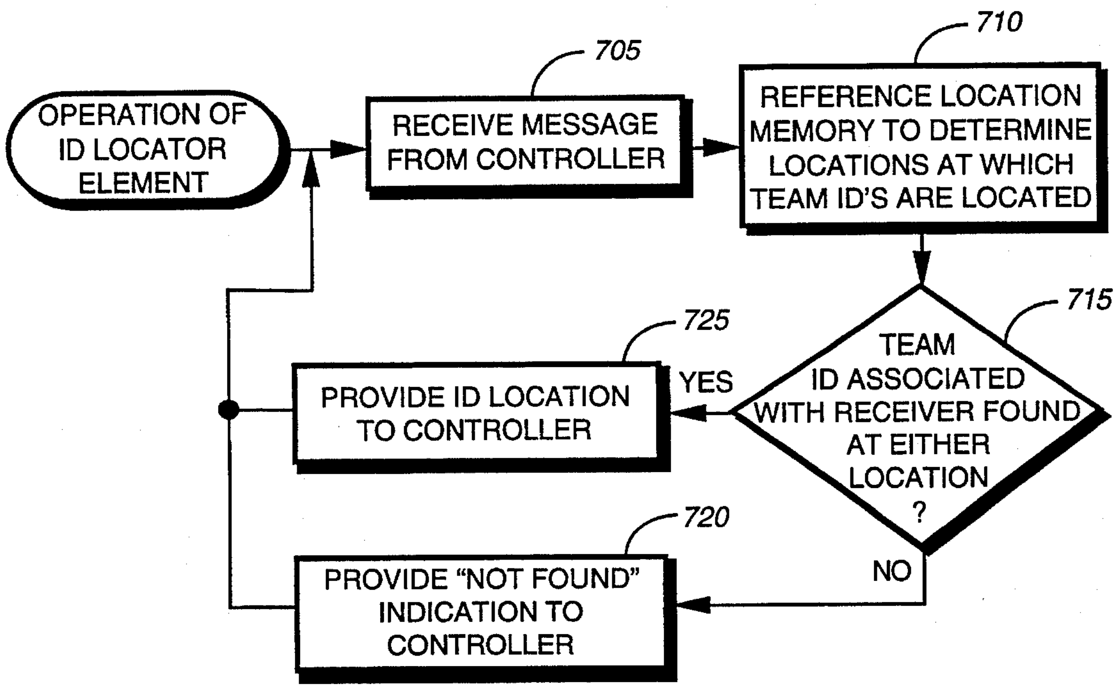
FIG. 7 is a flowchart illustrating the operation of an identification locator element included within the radio receiver of FIG. 5 in accordance with the present invention.

FIG. 7 is a flowchart of the operation of the ID locator element 550 (FIG. 5) in accordance with the present invention. At step 705, the ID locator element 550 receives the message from the controller 515. Thereafter, the ID locator element 550 references, at step 710, the location memory 525 to determined locations within the message at which the team IDs are located. When, at step 715, the team ID associated with the receiver 110 is not found at either of the message locations in which team IDs are transmitted, the ID locator element 550 generates, at step 720, a "not found" indication that is provided to the controller 515. When, conversely, the team ID associated with the receiver 110 is found in the message, the location of the ID is provided, at step 725, to the controller 515. This location can be, for example, indicated by the numbers of the message bits, e.g., bits nine through sixteen, in which the team ID is included.

Figure 8:
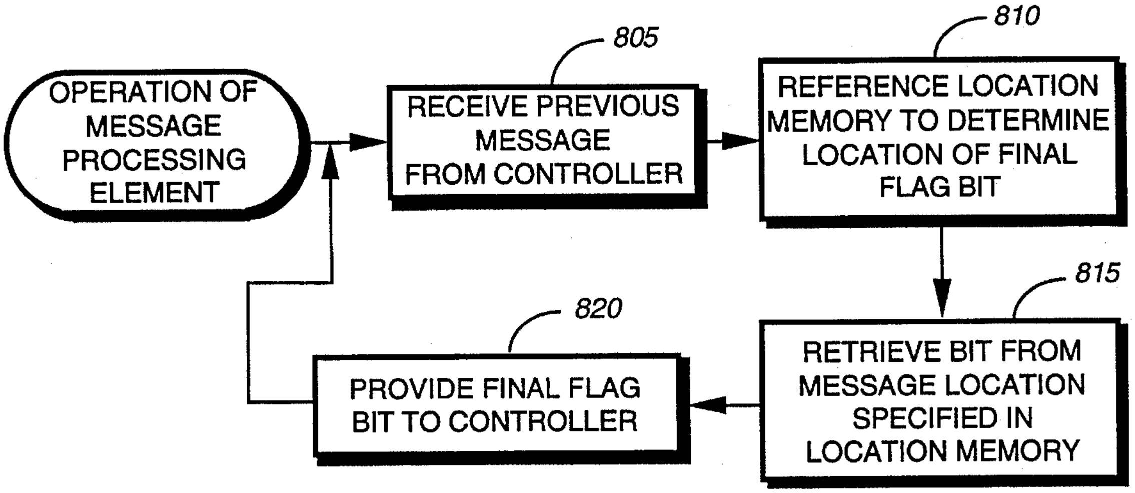
FIG. 8 is a flowchart depicting the operation of a message processing element included within the radio receiver of FIG. 5 in accordance with the present invention.

FIG. 8 is a flowchart depicting an example of the operation of the message processing element 555 (FIG. 5). At step 805, the message processing element 555 receives the previous message from the controller 515 and references, at step 810, the location memory 525 to determine the location of the final flag bit. This location can be, for instance, the twenty-fifth bit of the message. Thereafter, at step 815, the message processing element 555 retrieves the final flag bit from the message location specified in the location memory 525. At step 820, the final flag bit is provided to the controller 515, which determines from the bit value whether the game score is final or not.

In summary, the communication system as described above includes a terminal for transmitting a message which includes information about a particular sports event, such as a baseball game. The information can be, for instance, a game score. The message transmitted by the terminal further includes a flag for indicating a status of the sports event, e.g., whether or not the game score is final. A portable receiver carried by a service subscriber receives the message and decodes it to determine whether the message concerns a game in which a team associated with the receiver is playing. If so, the receiver further determines from the final flag in the message whether or not the message is a final message, which includes a final score, or a non-final message, which does not include a final score. The incoming message replaces any other previously received non-final message in memory so that the user is presented with only the latest update for a particular sports game.

According to the present invention, however, a previously received final message is not replaced by incoming messages. In this manner, the user can conveniently reference final scores for games in which he is interested even when further messages intended for reception by the receiver have been received. At the same time, the user is not presented with conflicting scores for a single game.

It will be appreciated by now that there has been provided a method and apparatus for selectively retaining messages about a particular topic such that the user can later refer to retained messages even when more recent messages have been received.

What is claimed is:

1. A method, in a radio receiver, for processing a message including information about a sports event, the method comprising the steps of:

locating, within the message, a final flag indicative of a status of the sports event within the message by referencing a memory to determine a predetermined location for the final flag within the message and retrieving the final flag at the predetermined location within the message;

determining whether the final flag is equivalent to a first or a second value;

determining that a score indicated by the message is a non-final score when the final flag is equivalent to the first value and that the score is a final score when the final flag is equivalent to the second value;

storing the message in the memory;

receiving a further message;

storing the further message in the memory and discarding the message when the score indicated by the message is a non-final score; and storing the further message in the memory without discarding the message when the score indicated by the message is a final score.

2. The method according to claim 1, further comprising the step of: determining from the message, prior to storing the message, whether the sports event involves a team associated with the radio receiver.

3. The method according to claim 1, further comprising the step of: determining from the further message, prior to storing the further message, whether the sports event involves a team associated with the radio receiver.

4. A method for processing a message including information about a sports event in a communication system comprising a terminal for transmitting messages and a radio receiver for receiving the messages, the method comprising the steps of:

the terminal transmitting the message and including therein a final flag indicative of a status of the sports event;

the radio receiver receiving the message;

the radio receiver locating the final flag within the message by referencing a memory to determine a predetermined location for the final flag within the message and retrieving the final flag at the predetermined location within the message;

the radio receiver determining whether the final flag is equivalent to a first or a second value;

the radio receiver determining that a score indicated by the message is a non-final score when the final flag is equivalent to the first value and that the score is a final score when the final flag is equivalent to the second value:

the radio receiver storing the message in a memory;

the radio receiver receiving a further message;

the radio receiver storing the further message in the memory and discarding the message when the score indicated by the message is a non-final score; and the radio receiver storing the further message in the memory without discarding the message when the score indicated by the message is a final score.

5. The method of claim 4, further comprising, prior to the transmitting step, the steps of:

the terminal receiving the information about the sports event, including the status of the sports event; and the terminal placing the final flag in a predetermined location of the message.

6. A radio receiver for processing a message including information about a sports event, the radio receiver comprising:

a message processing element for locating, within the message, a final flag indicative of a status of the sports event;

a controller coupled to the message processing element for determining whether the final flag is equivalent to a first or a second value, wherein the controller further determines that a score indicated by the message is a non-final score when the final flag is equivalent to the first value and that the score is a final score when the final flag is equivalent to the second value;

storing means for storing the message in a memory;

a receiving circuit for receiving a further message; and wherein the storing means comprises means for storing the further message in the memory and discarding the message when the score indicated by the message is a non-final score and for storing the further message in the memory without discarding the message when the score indicated by the message is a final score.

7. The radio receiver of claim 6, further comprising:

a location memory for storing a predetermined location of the final flag for use by the message processing element in locating the final flag within the message.

8. The radio receiver of claim 6, further comprising:

an alert mechanism for generating an alert to announce reception of the message; and a display for presenting the information about the sports event.

9. A communication system for processing a message including information about a sports event, the communication system comprising:

a terminal for transmitting the message including a final flag indicative of a status of the sports event; and a radio receiver for receiving the message, the radio receiver comprising:

a message processing element for locating the final flag within the message;

a controller coupled to the message processing element for determining whether the final flag is equivalent to a first or a second value, wherein the controller further determines that a score indicated by the message is a non-final score when the final flag is equivalent to the first value and that the score is a final score when the final flag is equivalent to the second value;

storing means for storing the message in a memory;

a receiving circuit for receiving a further message; and wherein the storing means comprises means for storing the further message in the memory and discarding the message when the score indicated by the message is a non-final score and for storing the further message in the memory without discarding the message when the score indicated by the message is a final score.

10. The communication system of claim 9, wherein the radio receiver further comprises:

a location memory for storing a predetermined location of the final flag for use by the message processing element in locating the final flag within the message.

11. The communication system of claim 9, wherein the radio receiver further comprises:

an alert mechanism for generating an alert to announce reception of the message; and a display for presenting the information about the sports event.

12. The communication system of claim 9, wherein the terminal further comprises:

a data entry device for receiving the information about the sports event;

a memory for storing predetermined locations for the information within the message; and an encoder for encoding the information, including the final flag, into the message, wherein the information is located at the predetermined locations within the message.

* * * * *